United States Patent
Bouzid et al.

(10) Patent No.: US 9,338,249 B2
(45) Date of Patent: May 10, 2016

(54) DISTRIBUTED USER PROFILE (75) Inventors: Makram Bouzid, Palaiseau (FR); David Bonnefoy, Paris (FR); Jerome Picault, Paris (FR)

(73) Assignee: Google Technology Holdings, Inc., Mountain View, CA (US)

(*) Notice: Subject to any disclaimer, the term of this patent is extended or adjusted under 35 U.S.C. 154(b) by 101 days.

(21) Appl. No.: 12/066,783

(22) PCT Filed: Aug. 25, 2006

(86) PCT No.: PCT/US2006/033274
§ 371 (c)(1),
(2), (4) Date: Mar. 13, 2008

(87) PCT Pub. No.: WO2007/037870
PCT Pub. Date: Apr. 5, 2007

(65) Prior Publication Data
US 2008/0288484 A1    Nov. 20, 2008

(30) Foreign Application Priority Data

Sep. 15, 2005 (GB) .................................. 0518857.8

(51) Int. Cl.
G06F 17/30 (2006.01)
H04L 29/08 (2006.01)

(52) U.S. Cl.
CPC ........ H04L 67/303 (2013.01); G06F 17/30766 (2013.01); H04L 67/10 (2013.01); H04L 67/306 (2013.01)

(58) Field of Classification Search
None
See application file for complete search history.

(56) References Cited

U.S. PATENT DOCUMENTS 5,694,595 A * 12/1997 Jacobs et al.
5,977,964 A * 11/1999 Williams et al. ............... 715/721

(Continued)

FOREIGN PATENT DOCUMENTS

| EP | 1309147 A | 5/2003 |
|---|---|---|
| EP | 1309147 A1 | 5/2003 |

OTHER PUBLICATIONS

Open Mobile Alliance: "SynchML Data Sync Protocol Candidate Version 1.2—Jun. 1, 2004", Internet Citation, [Online] Jun. 1, 2004, Retrieved from the Internet: URL:http://www.openmobilealliance.org/release_program/docs/DS/V12C/OMA-SyncML-DataSyncProtocol-V12-20040601-C.pdf, [retrieved on Apr. 4, 2006], all pages.

(Continued)

*Primary Examiner* — Bai D. Vu
(74) *Attorney, Agent, or Firm* — Dority & Manning, P.A.

(57) ABSTRACT

A reasoning apparatus (101) is arranged to determine device locations for user profile elements of a distributed user profile. A user profile processor (201) receives a user profile which comprises a plurality of user profile elements. Each user profile element furthermore comprises associated metadata. The apparatus (101) also comprises a device profile receiver (203) that receives device profiles for a plurality of devices. A device location processor (205) proceeds to determine device locations for the user profile elements in response to the associated metadata and the device profiles. Specifically, a user profile element may be assigned to a specific device if the device profile for that device matches the metadata for the user profile element. The reasoning apparatus (101) may furthermore comprise a user profile element synchronizer (207) which synchronizes the user profile elements with the appropriate devices.

20 Claims, 3 Drawing Sheets

(56) References Cited

U.S. PATENT DOCUMENTS

| | | | |
|---|---|---|---|
| 6,052,122 A * | 4/2000 | Sutcliffe et al. | 715/751 |
| 6,463,462 B1 * | 10/2002 | Smith et al. | 709/206 |
| 6,757,720 B1 | 6/2004 | Weschler, Jr. | |
| 6,886,017 B1 * | 4/2005 | Jackson et al. | |
| 7,191,179 B2 | 3/2007 | Shaw | |
| 7,340,438 B2 * | 3/2008 | Nordman et al. | 705/64 |
| 2002/0022453 A1 * | 2/2002 | Balog et al. | 455/41 |
| 2002/0147766 A1 * | 10/2002 | Vanska et al. | 709/203 |
| 2002/0174089 A1 * | 11/2002 | Tenorio | 707/1 |
| 2003/0028554 A1 * | 2/2003 | Koskimies et al. | 707/201 |
| 2003/0028871 A1 * | 2/2003 | Wang et al. | 725/9 |
| 2003/0074456 A1 | 4/2003 | Yeung et al. | |
| 2003/0120750 A1 * | 6/2003 | Gaxiola et al. | 709/219 |
| 2003/0149758 A1 * | 8/2003 | Riche et al. | 709/223 |
| 2004/0073787 A1 * | 4/2004 | Ban et al. | 713/159 |
| 2004/0107283 A1 | 6/2004 | Paddon | |
| 2004/0162818 A1 | 8/2004 | Shaw | |
| 2004/0243634 A1 * | 12/2004 | Levy | 707/104.1 |
| 2005/0108297 A1 | 5/2005 | Rollin et al. | |
| 2005/0181763 A1 * | 8/2005 | Enderlein | 455/411 |
| 2005/0209989 A1 * | 9/2005 | Albornoz et al. | 707/1 |
| 2006/0080415 A1 * | 4/2006 | Tu | 709/220 |
| 2006/0278064 A1 * | 12/2006 | Lourdeaux | 84/609 |
| 2007/0112748 A1 * | 5/2007 | Angell et al. | 707/4 |
| 2007/0206736 A1 * | 9/2007 | Sprigg et al. | 379/88.21 |
| 2007/0239722 A1 * | 10/2007 | Phillips | 707/9 |
| 2008/0162406 A1 * | 7/2008 | St. John-Larkin | 707/1 |
| 2008/0189295 A1 * | 8/2008 | Khedouri et al. | 707/10 |

OTHER PUBLICATIONS

Sur G et al.: "management of User Profile Information in UbiData", Internet Citation, [Online] 2003, Retrieved from the Internet: URL:http://www.cise.ufl.edu/tech_reports/tr03/tr03-001.pdf> [retrieved on Nov. 28, 2006], all pages.

Jonsson A Novak L: "SyncML—getting the mobile internet in sync", Ericsson Review (Incl. on), Telefonaktiebolaget L M Ericsson, SE, vol. 78, No. 3, Jan. 1, 2001, pp. 110-115.

Bohmert, Jorg: "Supplementary European Search Report", European Patent Office, Berlin, Germany, completed Dec. 21, 2009, all pages.

* cited by examiner

DISTRIBUTED USER PROFILE

PRIORITY CLAIM

The present application is a national stage application under 35 U.S.C. §371 of International Application Number PCT/US2006/033274 having a filing date of Aug. 25, 2006. International Application Number PCT/US2006/033274 claims priority to Great Britain Application Number 0518857.8 having a filing date of Sep. 15, 2005. The present application claims priority to and benefit of all such applications. International Application Number PCT/US2006/033274 and Great Britain Application Number 0518857.8 are hereby incorporated by reference in their entirety.

FIELD OF THE INVENTION

The invention relates to determining of device locations for a distributed user profile.

BACKGROUND OF THE INVENTION

In connection with the ever increasing popularity of electronic devices and communications, individual users are increasingly using a wider and wider range of devices having very different capabilities. For example, it is not unusual for a single individual to regularly use a cell phone, a Personal Digital Assistant (PDA), a laptop computer, a desktop computer, one or more set-top boxes etc.

Furthermore, the devices tend to be using an increasing variety of more and more complex applications. Such applications tend to provide customization to the individual users characteristics and preferences and therefore require personal information which is typically provided in the form of data stored in a user profile. Different applications and devices tend to require different levels of personal information about the user. However, current applications are generally unable to efficiently exchange user information with each other. Typically, a user needs to manually log on to different applications and to provide user profile information for each application. In addition, information obtained or generated by one application can generally not be used by other applications and updates to the user profile information cannot be easily distributed.

In order to address such disadvantages, it has been proposed to store user profiles separately from the applications that are using them. Specifically, it has been proposed to store a user profile centrally and to allow multiple applications and devices to access the centrally stored user profile when specific user profile information may be needed. Whereas this may allow a coherent and simplified experience for the individual user, it has a number of disadvantages including an increased complexity and resource requirement as the individual devices must access the central server whenever user profile information is needed. It furthermore requires that a central storage with all the user profile information is provided and continuously maintained and it may lead to a high sensitivity to errors or faults in the central storage server.

It has also been proposed to store the user profile on each device. However, this requires additional memory in each device in order to store the full user profile in each location. At the same time, different devices have different capabilities and requirements and therefore the optimal user profile for each device may vary substantially.

Hence, an improved system for user profile distribution would be advantageous and in particular a system allowing increased flexibility, increased adaptation to individual devices, reduced communication requirements, reduced storage requirements and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for determining device locations for user profile elements of a distributed user profile, the apparatus comprising: means for receiving a user profile comprising a plurality of user profile elements, each user profile element having associated metadata; means for receiving device profiles for a plurality of devices; reasoning means for determining device locations for the user profile elements in response to the associated metadata and the device profiles.

The invention may allow an improved apparatus for user profile management and/or may provide an improved distributed user profile. The local user profile stored on each device may be adapted to and/or customised for the individual device and may in particular reflect the device characteristics. The memory requirements for storing user profiles may be reduced for the individual devices and/or the required communication of user profile data between devices or a central user profile server may be reduced. The necessity of a central server may be avoided. The Inventors of the current invention have realised that improved performance and/or distribution of a user profile can be achieved by using metadata for user profile elements and device profiles to determine the location for the user profile elements.

According to an optional feature of the invention, the apparatus further comprises means for synchronizing at least one user profile element with a device in response to the determined device location for the at least one user profile element.

A user profile element can be synchronised with the device identified by the reasoning means for the user profile element. The feature may allow improved synchronisation and/or dynamic updating for a distributed user profile.

According to an optional feature of the invention, the apparatus comprises means for communicating a user profile element to a device location determined for that user profile element.

The communication may be over a suitable communication link such as a wireless communication link between the apparatus and the device. The feature may allow an efficient distribution of the user profile.

According to an optional feature of the invention, the reasoning means is arranged to generate a device specific user profile for each of the plurality of devices, each device specific user profile being a subset of the user profile.

The device specific user profile may be a local user profile generated from the global user profile for the specific device. The invention may allow an efficient distribution of the user profile to generate sub-profiles which are particularly suited for the individual devices on which they reside.

According to an optional feature of the invention, the reasoning means is arranged to evaluate a relevance criterion for metadata associated with each of the user profile elements in relation to device profiles of the plurality of devices, and to determine a device location for each user profile element as at least one device for which the relevance criterion is met.

This may allow an efficient, accurate and/or high-performance user profile distribution. Additionally or alternatively, it may allow an efficient implementation and may specifically allow a low complexity yet reliable distribution of the user profile.

According to an optional feature of the invention, the relevance criterion comprises a match criterion that at least one element of a user profile must have associated metadata that matches at least one element of a device profile.

This may allow an efficient, accurate and/or high-performance user profile distribution. Additionally or alternatively, it may allow an efficient implementation and may specifically allow a low complexity yet reliable distribution of the user profile.

According to an optional feature of the invention, the reasoning means comprises means for determining a first device location for a first user profile element as a first device having a device profile indicating that the first device comprises an application arranged to access the first user profile element.

This may allow an efficient, accurate and/or high-performance user profile distribution. Additionally or alternatively, it may allow an efficient implementation and may specifically allow a low complexity yet reliable distribution of the user profile. In particular, the feature may provide a high probability that user profile information required by an application is locally available on the device executing the application.

According to an optional feature of the invention, the reasoning means is arranged to determine a plurality of locations for a single user profile element.

This may allow improved performance. In particular, it may allow an increased probability that a user profile element is locally available on all devices executing an application using the user profile element.

According to an optional feature of the invention, a first device profile for a first device of the plurality of devices comprises at least one element selected from the group of: an indication of modalities available at the first device; an indication of a an application available at the first device; an indication of a capability of the device; and an indication of a display capability of the device.

This may allow improved performance and may in particular allow an efficient customisation of the locally stored user profile to the requirements and characteristics of the individual devices.

According to an optional feature of the invention, the associated metadata for a first user profile element comprises at least one data element selected from the group consisting of: an indication of a source application of the metadata for the first user profile element; an indication of a source application of the first user profile element; an indication of an application accessing the first user profile element; and an indication of a time of access of the first user profile element.

This may allow improved performance and may in particular allow an efficient customisation of the locally stored user profile to the requirements and characteristics of the individual devices.

According to an optional feature of the invention, the metadata comprises semantic metadata.

This may allow high performance, accurate distribution of the user profile elements and/or facilitated operation. In particular, it may improve the quality of the results by allowing the use of more sophisticated reasoning methods.

According to an optional feature of the invention, at least some of the metadata is structured according to one or more ontologies).

The feature may facilitate operation and/or may improve performance. In particular, an improved compatibility and interoperability between different systems, user profiles and devices may be achieved.

According to an optional feature of the invention, the means for receiving is arranged to receive the user profile from a single source.

The user profile may be generated or collected from a single central server and may be provided to the apparatus as a single user profile. The feature may allow facilitated operation, implementation and/or improved compatibility in some embodiments.

According to an optional feature of the invention, the means for receiving is arranged to receive the user profile from a plurality of sources.

The user profile may be a virtual user profile which is obtained by collating information from more than one source. The feature may allow facilitated operation, implementation and/or improved compatibility in some embodiments.

According to an optional feature of the invention, the apparatus further comprises means for annotating the user profile elements with the metadata This may allow a practical implementation and/or a user-friendly means of generating metadata suitable for distributing a user profile.

According to another aspect of the invention, there is provided a method of determining device locations for user profile elements of a distributed user profile, the apparatus comprising: receiving a user profile comprising a plurality of user profile elements, each user profile element having associated metadata; receiving device profiles for a plurality of devices; and determining device locations for the user profile elements in response to the associated metadata and the device profiles.

According to another aspect of the invention, there is provided a computer program product enabling the carrying out of the above described method.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
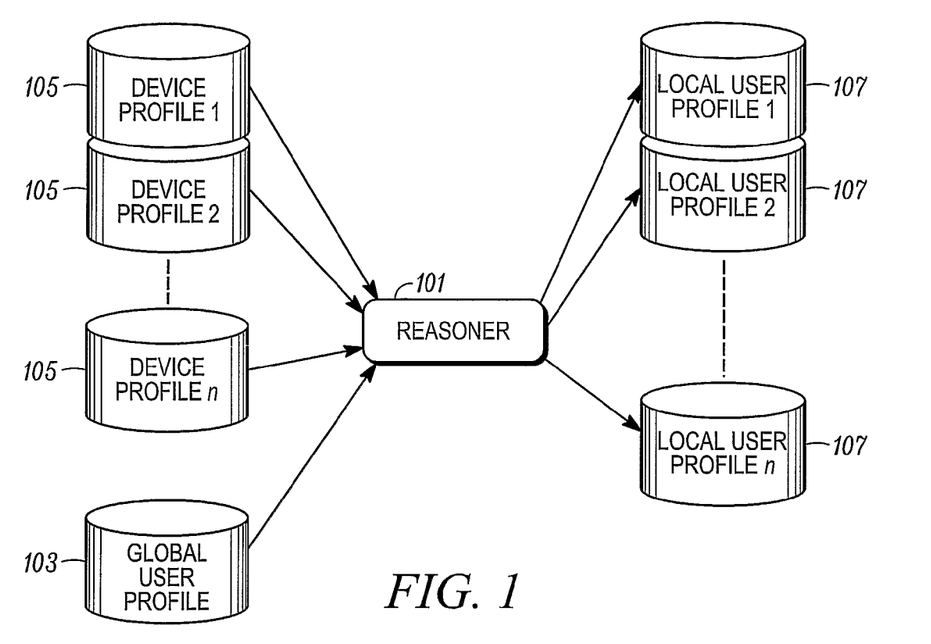
FIG. 1 illustrates a distributed user profile system in accordance with some embodiments of the invention.

FIG. 1 illustrates a distributed user profile system in accordance with some embodiments of the invention. In the system, a global user profile for a single user is distributed on a number of different devices that the user may use. Distributed management of user profiles allows reuse of profile information for different personalized services.

The system provides a mechanism for automatically managing the distribution of a global user profile across several devices using metadata for user profile elements and device profiles to determine on which device or devices the individual user profile element should be stored.

The system of FIG. 1 comprises a reasoning apparatus 101 which receives the global user profile 103. The global user profile 103 comprises a plurality of user profile elements each of which is indicative of a user characteristic or preference. For each of the user profile elements, the global user profile furthermore comprises some metadata which provides information of characteristics of the user profile element.

In addition, the reasoning apparatus 101 receives device profiles for a plurality of devices. Each of the devices may be a device used by the user of the global user profile 103. For example, one device may be the user's mobile phone, another device may be the user's laptop computer, and another device may be the user's PDA etc.

The reasoning apparatus 101 evaluates the metadata for the user profile elements in relation to the device profiles and determines a device location for each of the user profile elements in response thereto. The reasoning apparatus thus generates a number of local user profiles corresponding to the individual devices. The reasoning apparatus 101 can store each user profile element in the device identified by the reasoning algorithm. Thus, each device will contain a user sub-profile which is specifically suited for that device. Thus, the global user profile is divided into a plurality of user sub-profiles which are distributed amongst the devices.

Figure 2:
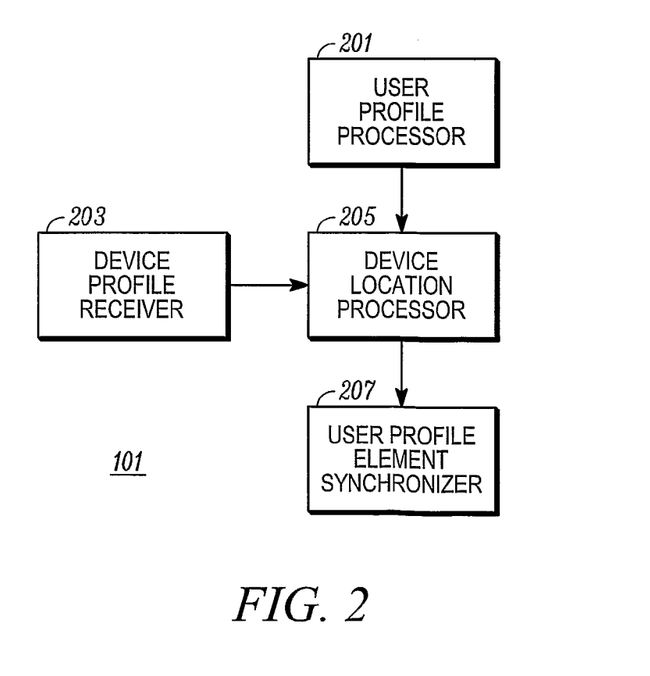
FIG. 2 illustrates an apparatus for determining device locations for user profile elements of a distributed user profile in accordance with some embodiments of the invention.

FIG. 2 illustrates the reasoning apparatus 101 in more detail.

The reasoning apparatus 101 comprises a user profile processor 201 which receives the global user profile 103. The global user profile 103 can be received from an external user profile server through a suitable communication link such as for example through a local area network, the Internet or a wireless communication link of a cellular communication system or an ad-hoc network.

It will be appreciated that in other embodiments, the user profile 103 may be received from an internal store, such as an internal user profile memory.

The reasoning apparatus 101 furthermore comprises a device profile receiver 203 which receives the device profiles 105 from the plurality of devices. It will be appreciated that the device profiles 105 can also be received through a suitable communication link such as for example through a local area network, the Internet or a wireless communication link of a cellular communication system or an ad-hoc network. Specifically, the user profile processor 201 and the device profile receiver 203 can be coupled to the same network interface (not shown) which interfaces the reasoning apparatus 101 to a network, such as the Internet, through which the global user profile 103 and the device profiles 105 are received.

In some embodiments, the device profiles may be received directly from the devices. For example, the device profile receiver 203 can comprise a wireless ad-hoc network interface, such as an IEEE 802.11x network interface. When the wireless ad-hoc network interface detects that a connection can be established to a device, such a connection is established and used to communicate the device profile directly from the device to the reasoning apparatus 101. As another example, the device profiles may be communicated over direct Bluetooth™ communication links between the individual device and the reasoning apparatus 101.

The device profiles comprise a number of characteristics and/or preferences for the individual device.

The user profile processor 201 and the device profile receiver 203 are coupled to a device location processor 205. The device location processor 205 determines the device locations for the user profile elements in response to the associated metadata for the user profile elements and the device profiles. In particular, the device location processor 205 compares the metadata for each individual user profile element to the device profile elements of the device profiles, and for each user profile element it selects a device on which to store the user profile element.

It will be appreciated, that in some embodiments, a user profile element may be stored on a plurality of devices. For example, if a user profile element closely matches the characteristics and preferences of two different devices, it can be advantageous to store this user profile element on both devices in order to have the required information locally available on both devices simultaneously.

It will also be appreciated that in some embodiments, some user profile elements may not be stored on any of the devices. For example, if the global user profile 103 comprises a user profile element which is not relevant to any of the devices in accordance with the metadata and the device profiles, the user profile element may simply be ignored or may be stored in the reasoning apparatus 101.

The device location processor 205 is coupled to a user profile element synchroniser 207 which is arranged to synchronise the individual user profile elements with the devices that have been identified for that user profile element. Specifically, if the device location processor 205 have identified that a specific user profile element should be stored in both the user's mobile phone and PDA, the user profile element synchroniser 207 can transmit the user profile element to both the PDA and the mobile phone. The transmissions may be individual transmissions over different communication links, such as two different messages being transmitted on separate Bluetooth™ links, or may a single message simultaneously broadcast to both devices. When the PDA and mobile phone receive the user profile element, they proceed to store the received data in the local user profile.

The reasoning apparatus 101 can thus provide an efficient distribution of the user profile of a user among the user's devices by using a reasoning mechanism based on using user profile metadata and device profiles to determine which elements of the user profile should be stored/synchronized on which devices. The user profile distribution can be considered optimized since each user device tends to only need to store user profile elements which are relevant to that specific device.

The global user profile 103 can comprise all the information the user wants to share/use, including both static information such as name, full address, etc. and dynamic, frequently changeable information, such as preferences about applications, devices, modalities, etc., that could be related to a user context or not. The information in the global user profile 103 is divided into the user profile elements, each of which will be located on one or more devices depending on the decision of the device location processor 205.

Each user profile element is annotated with some metadata. As a specific example, the metadata can comprise an indication of a source application of the first user profile element, such as the application that originally created the user profile element, or an indication of a source application for the metadata of the first user profile element, such as the application that originally annotated the user profile element with the metadata. As another specific example, the metadata can comprise an indication of an application accessing the first user profile element and/or an indication of a time of access of the first user profile element. E.g. when it is detected that an application accesses the first user profile element, new metadata may be generated that specifies characteristics of this access, such as the time at which it was accessed and the application identity of the application accessing the user profile element.

The metadata can specifically be semantic metadata and can be semantic metadata that has been manually entered by a user or operator of the system.

The metadata may furthermore comply with a suitable ontology. Specifically, the metadata may be structured and comprise data elements which are in accordance with a specific predetermined ontology. This may facilitate interoperability and compatibility between the reasoning apparatus 101 and a wide variety of devices. It may furthermore provide improved backwards compatibility and forwards compatibility as new devices and functionality can be introduced provided they adhere to the specified ontology.

It will be appreciated that in some embodiments, the metadata can be received with or can be comprised in the user preference profile 103. Alternatively or additionally, metadata can be generated by the reasoning apparatus 101 itself using an automatic or manual annotation of the received user preference profile 103. For example, in a simple embodiment, the reasoning apparatus 101 comprises a user interface that allows an operator to manually enter metadata for the user profile elements of the global user profile 103. As another example, the user profile processor 201 can comprise functionality for automatically scanning the received user profile 103 and for automatically generating metadata in accordance with a suitable algorithm. Different algorithms and approaches for generating metadata will be known to the person skilled in the art and need not be described in further detail herein.

The metadata must be stored in a suitable way and can for example be included with the user profile 103 itself. This can significantly increase the size of the user profile 103. In order to address this disadvantage, the metadata may be stored only on a centralized server having a large storage capacity. As another example, metadata can be associated with only a subset of the user profile 103. Specifically, only the most important or frequently used user profile elements can be annotated by metadata. In such cases, the device location processor 205 can select a default device location for user profile elements not having associated metadata or can e.g. store these elements itself or on all devices.

In the system, it is assumed that each device the user owns or uses has a device profile 105 which contains information about properties and characteristics of the individual device.

The device profile can for example comprise an indication of the modalities which are supported by the device, such as whether it supports voice, text, video etc. As another example, the device profile can comprise information of which applications are available on the device. For example, the applications can be specified by the input and output parameters in a suitable web service language. The device profile can alternatively or additionally comprise an indication of a capability of the device and in particular an indication of a display capability of the device. For example, the device profile can specify the size, resolution and colour capability of a display of the device.

A standardized device profile, such as CC/PP (Composite Capabilities/Preference Profiles, defined by the W3C: http://www.w3.org/Mobile/CCPP/) can be used and can provide homogeneous device descriptions thereby facilitating the operation of the device location processor 205.

In the example of FIG. 2, the device location processor 205 evaluates a relevance criterion for each user profile element by evaluating the metadata for the user profile elements with respect to the elements of the device profile.

Specifically, the device location processor 205 can sequentially process all user profile elements of the user profile of 103. For each user profile element, all the devices are processed sequentially and for each device it is determined whether the user profile element is relevant for the individual device.

For each user profile element and each device, the device location processor determines if there is a match between the information of the metadata for the user profile element and the information in the device profile for that device. It will be appreciated that any suitable relevance criterion or match criterion can be used without detracting from the invention.

For example, the metadata for the current user profile element can contain an indication of a specific application that has previously accessed the user profile element. If the device profile for the current device indicates that the device contains this application, a device location for the user profile element is determined as the identity of the device. Accordingly, the user profile element synchroniser 207 will download the user profile element to this specific device. The device location processor 205 can then proceed to evaluate other devices for the same user profile element or may proceed to the next user profile element in embodiments where a user profile element is only downloaded to a single device.

A specific example of the operation of the reasoning apparatus 101 is provided below in pseudo code:

```
Each time the elements of the user profile are synchronized:
    for each synchronized element in global user profile
        for each device
            while memory available
                if relevant(element, device)
                    Synchronize element on device.
                end if
            end while
        end for each
    end for each
```

The function relevant(element, device) used in this approach can be characterized by some suitable rules or specific properties. Specific, examples of rules that can be used are:

$\exists$property $\in$ profile(device); equals(metadata(element), property) $\Rightarrow$ relevant(element, device)
and
$\exists$property $\in$ profile(device), $\exists R \in$ {Concept relationships}; (R(metadata(element), relatedMetadata), equals(relatedMetadata, property)) $\Rightarrow$ relevant(element, device)

Figure 3:
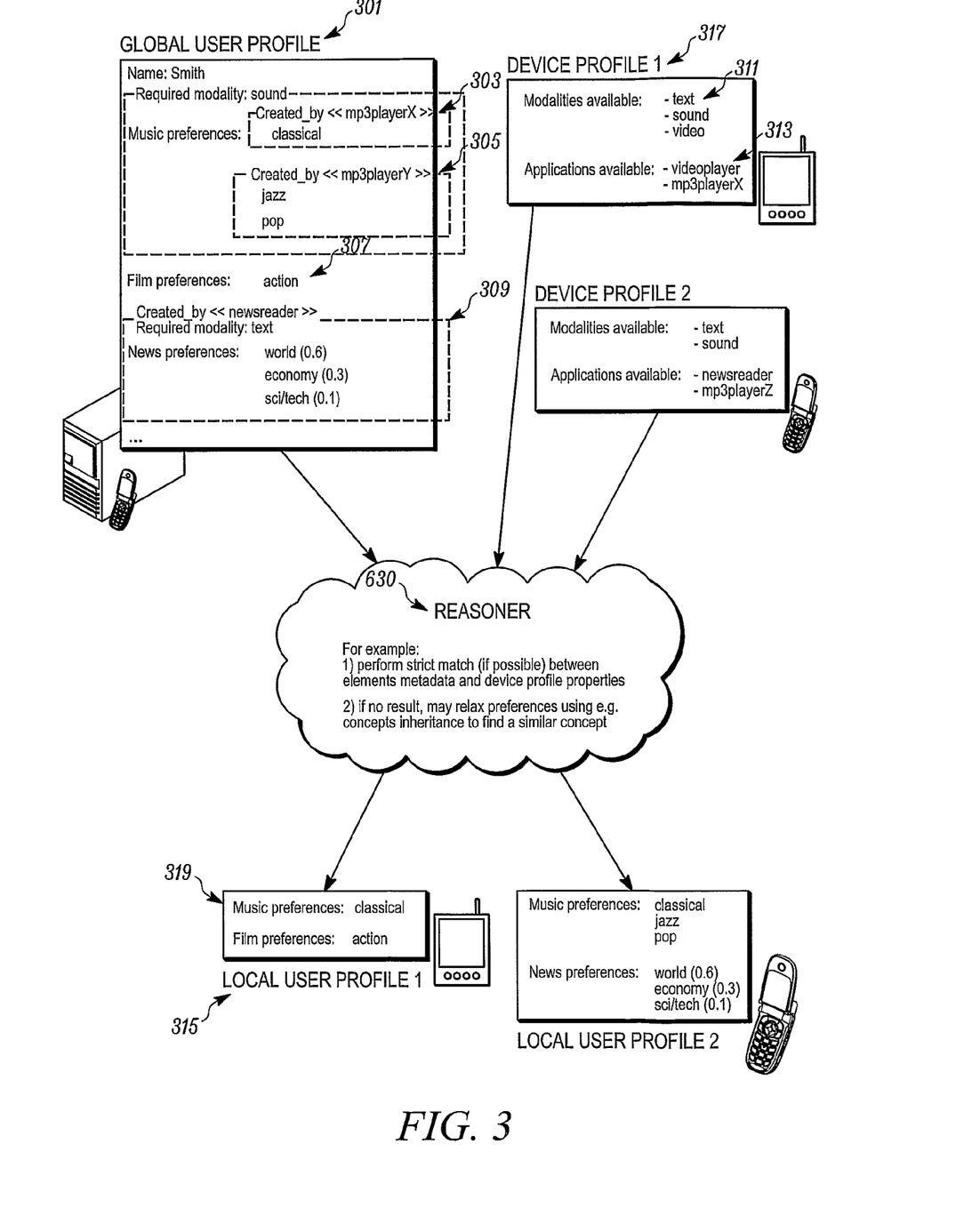
FIG. 3 illustrates an example of a determination of device locations for a distributed user profile in accordance with some embodiments of the invention.

These examples of rules can be illustrated through a specific example wherein a user profile is distributed on a plurality of devices depending on the modalities that are available on the devices. FIG. 3 illustrates this example.

In this example, the global user profile 301 is constituted by the group of elements 303, 305, 307, 309.

In the following, the process applied for device 1 will be described (a similar process will apply to all other devices). The profile of device 1 contains several groups of properties 311 and 313. It is assumed that the device location processor 205 in the example only uses the first rule of the two rules described above.

In the example, the device location processor 205 starts by examining the user profile element 303. In order to evaluate its relevance to device 1 and therefore to determine if this element should be part of local user profile 315 on device 1, the device location processor 205 uses the first rule: two metadata are associated with element 303: 'mp3playerX' and the 'sound' modality (the latter is common to elements 303 and 305). The device profile for device 1 contains the properties 'sound' (in properties group 311) and 'mp3playerX' (in properties group 313). As there is a perfect match between the above user profile element's metadata and the properties of the device profile, the element 303 is considered to be relevant for device 1 and will be synchronized to appear on the local user profile 319 of that device.

Similarly, the user profile element 305 is not judged relevant for device 1 because the associated metadata 'mp3playerY' is not equal to any of the device properties of user profile 317, therefore it will not be synchronized.

A similar mechanism is used for other elements and other devices.

The global user profile 103 can be a considered a real single global user profile or can be considered a virtual single global user profile.

Figure 4:
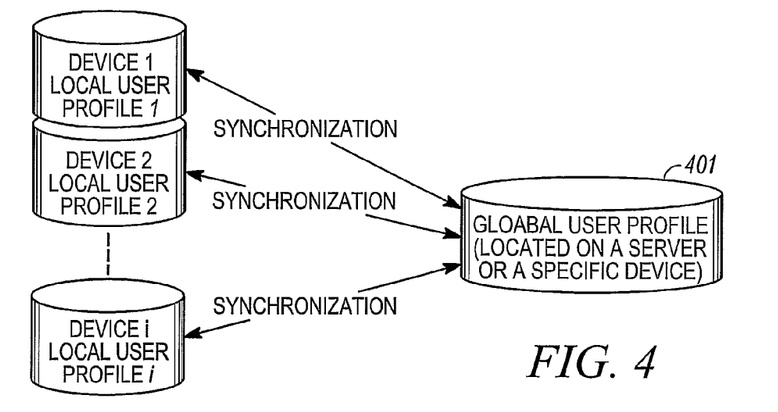
FIG. 4 illustrates an example of a user profile stored in a single location.

A real single global user profile 103 is illustrated in FIG. 4 and corresponds to the case where the global user profile 103 is stored physically on one central component 401 in the network. This central component can e.g. be located on a server hosted by the operator or on one of the user's devices, such as his home computer. In the example, the user profile processor 201 receives the global user profile 103 from the single central network component 401.

Figure 5:
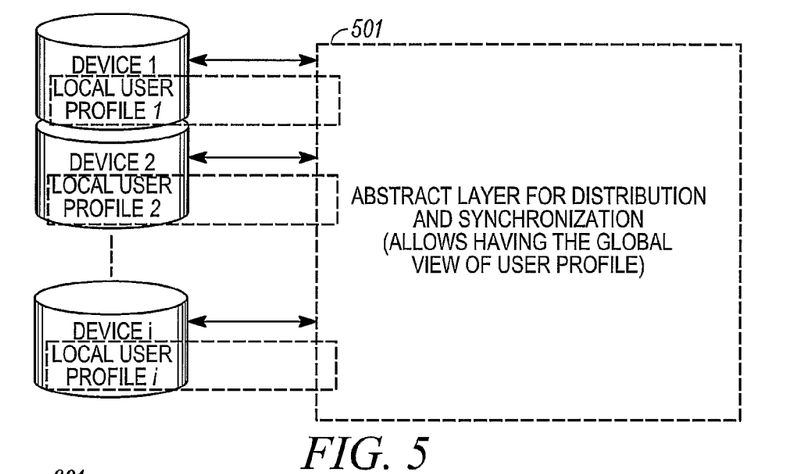
FIG. 5 illustrates an example of a user profile stored in a plurality of locations.

A virtual single global user profile is illustrated in FIG. 5 and can correspond to a completely decentralized architecture where the global user profile can be physically distributed and stored among several devices. Thus, in such cases the user profile processor 201 can receive the user profile from a plurality of sources. In some such embodiments, the user profile processor 201 can comprise an abstract layer 501 which hides this complexity.

It will be appreciated that the described system can provide significant advantages. For example, in many conventional systems, a distribution of the user profile can degrade the quality of the personalization that can be achieved as not all data may be available when needed. However, the described system can provide a high likelihood that the most pertinent part of the user profile is available locally to the devices that require it. The distribution of a user profile among a user's devices should allow him to access any service at any time without depending on the accessibility of a user profile server furthermore reducing network communications and service access times. In addition, if the user profile is hosted by the network provider as in many conventional systems, it can be difficult for the user to retrieve his preferences if he decides to change providers. This problem may be alleviated or obviated by the system of FIG. 1.

Figure 6:
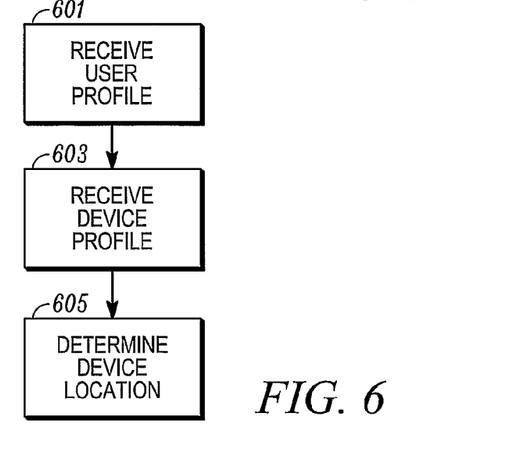
FIG. 6 illustrates a flow chart for a method of determining device locations for user profile elements of a distributed user profile in accordance with some embodiments of the invention.

FIG. 6 illustrates a flow chart of a method of determining device locations for user profile elements of a distributed user profile in accordance with some embodiments of the invention.

The method initiates in step 601 wherein a user profile comprising a plurality of user profile elements is received. Each user profile element comprises associated metadata.

Step 601 is followed by step 603 wherein device profiles for a plurality of devices are received.

Step 603 is followed by step 605 wherein device locations for the user profile elements are determined in response to the associated metadata and the device profiles.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An apparatus for determining device locations for user profile elements of a distributed user profile, the apparatus comprising:
    a receiver to receive a plurality of device profiles for a plurality of devices, the device profile for each device describing one or more device properties of the corresponding device, the one or more device properties described by the device profile for each device including one or more device applications present on the corresponding device; and a processor operable to receive a user profile comprising a plurality of user profile elements, each user profile element having associated metadata that describes one or more element properties of the corresponding user profile element, the one or more element properties described by the metadata for each user profile element including one or more accessing applications for which the corresponding user profile element is accessible;

wherein the processor is operable to determine one or more device locations for each of the user profile elements by:
assessing a relevance criteria that compares the one or more accessing applications described by the metadata of each user profile element with the one or more device applications described by each device profile, wherein said assessing includes determining, for each user profile element and device, whether any of the one or more accessing applications and the one or more device applications match; and
for each combination of user profile element and device for which at least one of the one or more accessing applications and the one or more device applications are determined to match, determining that such user profile element has such device as a device location; and a transmitter to communicate a plurality of subsets of the user profile respectively to the plurality of devices, each subset of the user profile including one or more user profile elements, the one or more user profile elements included in the subset transmitted to each device comprising only user profile elements for which such device has been determined as a device location.

2. The apparatus of claim 1 wherein the processor is operable to control synchronizing with the at least one device at least one user profile element in said subset of the user profile in response to said determining based on said relevance criteria that the at least one device is to receive said subset of the user profile.

3. The apparatus of claim 1 wherein the processor is operable to generate a device specific user profile for each of the plurality of devices, a plurality of said device specific user profiles being a subset of the user profile.

4. The apparatus of claim 1 wherein the processor is operable to determine a plurality of locations for a single user profile element.

5. The apparatus of claim 1 wherein a first device profile for a first device of the plurality of devices further comprises at least one element selected from the group of:
an indication of modalities available at the first device; and
an indication of a display capability of the device.

6. The apparatus of claim 1 wherein the associated metadata that describes the one or more accessing applications comprises at least one data element selected from the group consisting of:
an indication of a source application of the metadata for the first user profile element;
an indication of a source application of the first user profile element; and
an indication of an application accessing the first user profile element.

7. The apparatus of claim 1 wherein the metadata comprises semantic metadata.

8. The apparatus of claim 1 wherein at least some of the metadata is structured according to one or more ontologies.

9. The apparatus of claim 1 wherein the processor is operable to receive the user profile from a single source.

10. The apparatus of claim 1 wherein the processor is operable to receive the user profile from a plurality of sources.

11. The apparatus of claim 1 wherein at least one of the user profile elements is communicated to at two or more of the plurality of devices for storage.

12. The apparatus of claim 1 wherein at least one of the user profile elements is not communicated to any of the plurality of devices for storage.

13. The apparatus of claim 1 wherein the metadata for each user profile element comprises metadata that specifies a time of an access of the user profile element by one of the accessing applications.

14. The apparatus of claim 1 wherein the metadata associated with each user profile element is stored with the corresponding user profile element.

15. The apparatus of claim 1 wherein the metadata associated with each user profile element is stored only on a centralized server.

16. A method of determining device locations for user profile elements of a distributed user profile, the method comprising:
receiving, by one or more computing devices, a user profile comprising a plurality of user profile elements, each user profile element having associated metadata that describes one or more element properties of the corresponding user profile element, wherein the one or more element properties described b the metadata for each user profile element comprise one or more accessing applications for which the corresponding user profile element is usable;
receiving, by the one or more computing devices, a plurality of device profiles respectively for a plurality of devices, each device profile describing one or more device properties of the corresponding device, wherein the one or more device properties described by the device profile for each device comprise one or more device applications that are present on the corresponding device;
determining, by the one or more computing devices, device locations for the user profile elements in response to a relevance criteria that compares the one or more accessing applications described by the metadata of each user profile element of the user profile with the one or more device applications described by each device profile, wherein said determining, by the one or more computing devices, device locations includes:
determining, by the one or more computing devices for each user profile element and device, whether any of the one or more accessing applications and the one or more device applications match; and
for each combination of user profile element and device for which the corresponding one or more accessing applications and the corresponding one or more device applications include at least one match, determining, by the one or more computing devices, that such user profile element has such device as a device location; and
transmitting, by the one or more computing devices, a plurality of subsets of the user profile respectively to the plurality of devices, each subset of the user profile including one or more user profile elements, the one or more user profile elements included in the subset transmitted to each device comprising only user profile elements for which such device has been determined as a device location.

17. The method of claim 16 wherein the metadata comprises semantic metadata.

18. The method of claim 16 wherein at least some of the metadata is structured according to one or more ontologies.

19. The method of claim 16, further comprising:
for each instance in which one of the one or more accessing applications accesses one of the user profile elements, editing, by the one or more computing devices, the metadata associated with such user profile element to indicate a time of access of such user profile element and an identity of the application that accessed such user profile element.

20. A data processor having computer executable instructions for performing a method of determining device locations for user profile elements of a distributed user profile, the method comprising:
receiving a user profile comprising a plurality of user profile elements, each user profile element having associated metadata that describes one or more element properties of the corresponding user profile element, wherein the one or more element properties described by the metadata for each user profile element comprise one or more accessing applications for which the corresponding user profile element is usable;
receiving a plurality of device profiles respectively for a plurality of devices, each device profile describing one or more device properties of the corresponding device wherein the one or more device properties described by the device profile for each device comprise one or more device applications that are present on the corresponding device;
determining device locations for the user profile elements in response to a relevance criteria that compares the one or more accessing applications described by the metadata of each user profile element of the user profile with the one or more device applications described by each device profile, wherein said determining device locations includes:
determining, for each user profile element and device, whether any of the one or more accessing applications and the one or more device applications match; and
for each combination of user profile element and device for which at least one of the one or more accessing applications and the one or more device applications are determined to 'match, determining that such user profile element has such device as a device location;
determining, based on said relevance criteria, devices to receive only subsets of the user profile, the subsets of the user profile including one or more user profile elements; and
transmitting said subsets of the user profile to respective ones of the devices to receive only subsets of the user profile, the one or more user profile elements included in the subset transmitted to each device comprising only user profile elements for which such device has been determined as a device location.

* * * * *